US012784356B2

(12) United States Patent
Tanksale

(10) Patent No.: US 12,784,356 B2
(45) Date of Patent: Nov. 3, 2026

(54) 3-DIMENSIONAL (3D) MAP GENERATION SYSTEM AND METHOD FOR CREATING 3D MAP OF SURROUNDINGS OF A VEHICLE

(71) Applicant: Continental Autonomous Mobility Germany GmbH, Ingolstadt (DE)

(72) Inventor: Tejas Tanksale, Pune (IN)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 157 days.

(21) Appl. No.: 18/506,192

(22) Filed: Nov. 10, 2023

(65) Prior Publication Data

US 2024/0161402 A1 May 16, 2024

(30) Foreign Application Priority Data

Nov. 15, 2022 (GB) ...................................... 2217005

(51) Int. Cl.
*G06T 17/05* (2011.01)
*B60W 40/02* (2006.01)
*G06V 20/40* (2022.01)

(52) U.S. Cl.
CPC ............. *G06T 17/05* (2013.01); *B60W 40/02* (2013.01); *G06V 20/44* (2022.01)

(58) Field of Classification Search
None
See application file for complete search history.

(56) References Cited

U.S. PATENT DOCUMENTS 10,491,885 B1 11/2019 Hicks
10,841,483 B1 * 11/2020 Hunt .......................... G06T 7/13
11,479,213 B1 10/2022 Kentley-Klay
2014/0093131 A1 4/2014 Fan
2017/0248963 A1 * 8/2017 Levinson ............. G05D 1/0274
2019/0011566 A1 * 1/2019 Yan ........................ G01S 17/931
2019/0387216 A1 * 12/2019 Hicks ...................... G01S 17/10
2020/0158875 A1 5/2020 Feng
2021/0225020 A1 * 7/2021 Nonn ................... H04N 13/117
2023/0370701 A1 * 11/2023 Aluru ...................... B60R 11/04

FOREIGN PATENT DOCUMENTS

WO 2016130719 A2 8/2016
WO 2021255606 A1 12/2021

OTHER PUBLICATIONS

Search Report dated May 16, 2023 for Great Britain Patent Application No. 2217005.4 which this application claims priority.

(Continued)

*Primary Examiner* — Kent W Chang
*Assistant Examiner* — Jonathan M Cofino
(74) *Attorney, Agent, or Firm* — Fitch, Even, Tabin & Flannery LLP

(57) ABSTRACT

A method, a 3D map generation system, and a device for generating 3D map of surroundings of a vehicle. In the system, conditions of the surroundings are detected. Further, cameras and sensing devices are operated based on the conditions to generate a 3D data representation of the surroundings. A combined 3D map of the surroundings is generated using a combination of the 3D data representation obtained from the cameras and the sensing devices.

4 Claims, 5 Drawing Sheets

(56) References Cited

OTHER PUBLICATIONS

Keisuke Yoneda et al., "Automated driving recognition technologies for adverse weather conditions", IATSS Research, vol. 43, Issue 4, Dec. 2019, pp. 253-262.
Zhangjing Wang et al., "Multi-Sensor Fusion in Automated Driving: A Survey", Published in: IEEE Access ( vol. 8), pp. 2847-2868, Electronic ISSN: 2169-3536, INSPEC Accession No. 19312418, DOI: 10.1109/Access.2019.2962554.
Urs Niesen et al., "Camera-Radar Fusion for 3-D Depth Reconstruction", Published in: 2020 IEEE Intelligent Vehicles Symposium (IV), Date of Conference: Oct. 19, 2020-Nov. 13, 2020, pp. 265-271, https://doi.org/10.1109/IV47402.2020.9304559.
Shizhe Zang et al., "The Impact of Adverse Weather Conditions on Autonomous Vehicles: Examining how rain, snow, fog, and hail affect the performance of a self-driving car", IEEE Vehicular Technology Magazine ( vol. 14, Issue: 2, Jun. 2019), pp. 103-111, DOI: 10.1109/MVT.2019.2892497.
Science Daily, "Upgraded radar can enable self-driving cars to see clearly no matter the weather", University of California—San Diego, Nov. 17, 2020.
Daejun Kang et al., "Camera and Radar Sensor Fusion for Robust Vehicle Localization via Vehicle Part Localization", IEEE Access ( vol. 8), pp. 75223-75236, Date of Publication: Apr. 29, 2020, DOI: 10.1109/Access.2020.2985075.
Office Action dated Mar. 13, 2024 from corresponding European patent application No. 23187722.6.
Partial EP Search Report dated Jul. 29, 2024 from corresponding European patent application No. 23187722.6.
European Patent Office, Communication pursuant to Article 94(3) EPC dated Jul. 16, 2025, from corresponding European Patent Application No. 23187722.6, 3 pages.

* cited by examiner

3-DIMENSIONAL (3D) MAP GENERATION SYSTEM AND METHOD FOR CREATING 3D MAP OF SURROUNDINGS OF A VEHICLE

CROSS-REFERENCE TO RELATED APPLICATIONS

The present application claims priority from Great Britain Application No. 2217005.4 filed on Nov. 15, 2022, the content of which is herein incorporated by reference.

BACKGROUND

1. Field

Embodiments of the present application relate to autonomous vehicles, and more particularly, but not exclusively, to a 3-Dimensional (3D) map generation system, method, and device for generating a 3D map of surroundings of a vehicle.

2. Description of Related Art

In self-driving or autonomous vehicles, perception of environment during special conditions such as rain, fog, low-light situation, obstruction of camera setup due to foreign objects etc. becomes difficult. When these special conditions occur, the camera sensing might be affected, causing problems for creating a Three-Dimensional (3D) map of the environment with the help of a camera setup. To take care of such problems, the conventional approaches suggest accompanying the camera by a radar device. However, this requires higher processing power as both the camera and the radar devices run in parallel. Moreover, radar processing requires an additional computing device, which will increase the cost and add to the hardware complexity of the setup.

The information disclosed in this background of the disclosure section is for enhancement of understanding of the general background of the application and should not be taken as an acknowledgement or any form of suggestion that this information forms the prior art already known to a person skilled in the art.

SUMMARY

Disclosed herein is a Three-Dimensional (3D) map generation system for generating 3D map of surroundings of a vehicle The 3D map generation system comprises a processor, one or more cameras, one or more detectors and one or more sensing devices. The one or more cameras are configured for monitoring the surroundings of the vehicle. The one or more detectors are configured for detecting one or more special conditions of the surroundings. The one or more sensing devices are configured for monitoring the surroundings of the vehicle. The processor is configured to detect the one or more special conditions of the surroundings using the one or more detectors. Further, the processor is configured to control each of the one or more cameras and the one or more sensing devices to operate alternately, upon detecting the one or more special conditions. Thereafter, the processor is configured to generate a 3D data representation of the surroundings based on image data captured by the one or more cameras. Furthermore, the processor is configured to generate a further 3D data representation of the surroundings based on sensor data captured by the one or more sensing devices. Thereafter, the processor is configured to detect one or more bad regions in the 3D data representation and replace the one or more bad regions in the 3D data representation with corresponding regions in the further 3D data representation, to result in a combined 3D map.

Further, the present disclosure relates to a computer-implemented method for creating 3-Dimensional (3D) map of surroundings of a vehicle. The method comprises controlling each of one or more cameras and one or more sensing devices to operate alternately, based on one or more detectors detecting one or more special conditions of the surroundings. Further, the method comprises generating a 3D data representation of the surroundings based on image data captured by the one or more cameras. Thereafter, the method comprises generating a further 3D data representation of the surroundings based on sensor data captured by the one or more sensing devices. Furthermore, the method comprises detecting one or more bad regions in the 3D data representation. Finally, the method comprises replacing the one or more bad regions in the 3D data representation with corresponding regions in the further 3D data representation, to result in a combined 3D map.

Further, the present disclosure relates to a device configured for creating 3-Dimensional (3D) map of surroundings of a vehicle. The device is configured to detect one or more special conditions of the surroundings using one or more detectors. Further, the device is configured to control each of one or more cameras and one or more sensing devices to operate alternately, upon detecting the one or more special conditions. Thereafter, the device is configured to generate a 3D data representation of the surroundings based on image data captured by the one or more cameras. Furthermore, the device is configured to generate a further 3D data representation of the surroundings based on sensor data captured by the one or more sensing devices. Thereafter, the device is configured to detect one or more bad regions in the 3D data representation. Lastly, the device is configured to replace the one or more bad regions in the 3D data representation with corresponding regions in the further 3D data representation, to result in a combined 3D map.

Embodiments of the disclosure according to the above mentioned Three-Dimensional (3D) map generation system, method and device bring about several technical advantages.

In an embodiment, the Three-Dimensional (3D) map generation system according to the present disclosure helps in generating an accurate and clear 3D map of a surroundings of the vehicle even in the adverse weather conditions and/or malfunction of the one or more cameras.

In an embodiment, the Three-Dimensional (3D) map generation system according to the present disclosure ensures that the one or more sensing devices are activated only during the special conditions of the surroundings. That is, only the feed from the one or more cameras are used for generating the 3D map in normal conditions of the surroundings. This helps in optimal usage of the one or more sensing devices, reducing complexity/time of computation and preventing additional processing costs.

In an embodiment, according to the present disclosure, the one or more cameras and the one or more sensing devices are activated sequentially and/or alternately in a multiplexed time frame. This helps in reducing the processing time required for generating the 3D map of the surroundings.

In an embodiment, the 3D map generation system according to the present disclosure dynamically detects and replaces the bad regions in the 3D data representation. This helps in generating accurate 3D map of the surroundings.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and together with the description, serve to explain the disclosed principles. In the figures, the left most digit(s) of a reference number identifies the figure in which the reference number first appears. The same numbers are used throughout the figures to reference like features and components. Some embodiments of 3D map generation system and/or methods in accordance with embodiments of the present subject matter are now described below, by way of example only, and with reference to the accompanying figures, in which.

DETAILED DESCRIPTION

Figure 1A:
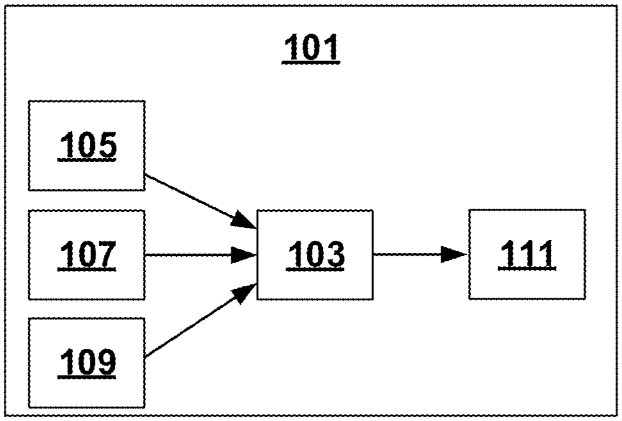
FIG. 1A illustrates a block diagram of a 3D map generation system, in accordance with some embodiments of the present disclosure.

It should be appreciated by those skilled in the art that any block diagrams herein represent conceptual views of illustrative 3D map generation systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non exclusive inclusion, such that a setup, device or method that comprises a list of components or steps does not include only those components or steps but may include other components or steps not expressly listed or inherent to such setup or device or method. In other words, one or more elements in a Three-Dimensional (3D) map generation system or apparatus proceeded by "comprises . . . a" does not, without more constraints, preclude the existence of other elements or additional elements in the 3D map generation system or method.

In various contexts, 3D data representation may refer to any one of 3D point cloud, voxel data, meshes etc.

In an embodiment, when any special conditions are detected in a surrounding environment of the vehicle, the 3D map generation system activates both the one or more sensing devices and the one or more cameras and controls/operates them sequentially or alternately for generating a 3D map of the surroundings. At regular intervals, the one or more sensing devices are activated for processing, such that, at a particular time, the processing happens through either the one or more sensing devices or the one or more cameras. In case when the one or more sensing devices are activated, the one or more sensing devices take over as the primary Three-Dimensional (3D) map generator. The 3D map may include a 3D data representation. The 3D data representation is generated using the image data captured by the one or more cameras which is then validated by a software for bad regions. The 3D data representation may include point cloud, voxel data, meshes etc. The bad regions are eliminated and only those which have valid data are fused with the 3D map generated by the one or more sensing devices. The combined operation of the one or more cameras and the one or more sensing devices offers speed as well as accuracy for generating the 3D maps. Finally, when the surrounding conditions return to normal, the one or more sensing devices are stopped from processing and the 3D map is generated using only the one or more cam eras.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1A illustrates a block diagram of a 3D map generation system, in accordance with some embodiments of the present disclosure.

In an embodiment, a vehicle, may be configured with a Three-Dimensional (3D) map generation system 101 for creating 3D map 111 of surroundings of the vehicle. As an example, the vehicle may be a passenger vehicle such as a car, a van and/or a commercial vehicle such as pick-up trucks. In an embodiment, the 3D map generation system 101 may include, without limiting to, a processor 103, one or more cameras 105, one or more detectors 107 and one or more sensing devices 109. In an embodiment, the processor 103 may be, without limitation, an Electronic Control Unit (ECU) or any computing unit configured within the vehicle. In an embodiment, the 3D map generation system 101 may be a dedicated computing unit and/or an ECU dedicated for creating the 3D map 111 of the surroundings of the vehicle. Alternatively, an existing ECU of the vehicle may be upgraded to perform functionalities of the proposed 3D map generation system 101, in accordance with the embodiments of the present disclosure.

In an embodiment, the one or more cameras 105 of the 3D map generation system 101 may be configured to monitor the surroundings of the vehicle. In an embodiment, the one or more cameras 105 may be placed at different positions in the vehicle. As an example, the one or more cameras 105 may be placed, without limitation, on the front side of the vehicle, rear side of the vehicle or on the sides of the vehicle. In an embodiment, the one or more detectors 107 may be configured to detect one or more special conditions of the surroundings. As an example, the one or more detectors 107 may comprise, without limitation, a temperature sensor, a humidity sensor, a rain sensor and the like. In an embodiment, the one or more special conditions includes, without limiting to, at least one of occurrence of an adverse weather condition, a low light condition, a low visibility condition or a physical obstruction to the one or more cameras 105. As an example, the adverse weather condition may include, without limitation, rain, fog, sandstorm and the like.

In an embodiment, the one or more sensing devices 109 of the 3D map generation system 101 may be configured to monitor the surroundings of the vehicle. As an example, the one or more sensing devices 109 may include, without limitation, a Radio Detection and Ranging (RADAR), Light Detection and Ranging (LiDAR) and the like.

In an embodiment, the 3D map generation system may generate the 3D map 111 of the surroundings using only the one or more cameras 105 during the normal conditions of the surroundings. However, when the one or more detectors 107 detect one or more special conditions in the surroundings, the 3D map generation system 101 may control each of the one or more cameras 105 and the one or more sensing devices 109 to operate sequentially or alternately at a predefined alternative time interval. As an example, the predefined time interval may be 20 milliseconds (ms). In an embodiment, when both the cameras 105 and the sensing devices 109 are being operated, the one or more sensing devices 109 may be used as the primary 3D map generator.

According to various embodiments, for normal operations, the processor may use sensing devices 109 if it is suitable for the conditions. The processor may activate time multiplexed processing, in response to the one or more detectors 107 detecting abnormal conditions. The default settings may employ either cameras 105 or sensing devices 109.

In an embodiment, during the one or more special conditions, the 3D map generation system 101 generates a 3D data representation of the surroundings based on image data captured by the one or more cameras 105 and also generates a further 3D data representation of the surroundings based on sensor data captured by the one or more sensing devices 109. In an embodiment, the 3D map generation system 101 uses a first pretrained Artificial Intelligence (AI) model to generate 3D data representation using Two-Dimensional (2D) images captured by the one or more cameras 105. As an example, the first pretrained AI model may comprise, without limitation, a Pyramid Stereo Matching Network (PSMNet) model, a DeepPruner model and the like. In an embodiment, the first pretrained AI model generates a disparity matrix/disparity data, which is then converted to the corresponding 3D data representation. Further, the 3D data representation is rendered in a 3D space for obtaining the corresponding 3D map 111.

In an embodiment, after obtaining the further 3D data representation based on the sensor data captured by the one or more sensing devices 109, the 3D map generation system 101 may detect one or more bad regions in the 3D data representation generated using the image data of the one or more cameras 105 using a second predefined Artificial Intelligence (AI) model. As an example, the second predefined AI model may comprise, without limitation, convolutional neural network, YOLOv5, segmentation networks, and the like. Subsequently, upon detecting the one or more bad regions, the 3D map generation system 101 may replace the one or more bad regions in the 3D data representation with corresponding regions in the further 3D data representation, to result in a combined 3D map 111.

In an embodiment, the one or more cameras 105 and the one or more sensing devices 109 may be placed in such a way that both the cameras 105 and the sensing devices 109 cover at least substantially same field of view. When the one or more cameras 105 and the one or more sensing devices 109 have a different field of view, the 3D map generation system 101 uses a precalculated translation matrix to generate the 3D map 111 since the 3D data representation and the further 3D data representation are in different 3D coordinate spaces. In an embodiment, the 3D map 111 generated may be used by an autonomous driving system of the vehicle for autonomous driving of the vehicle.

In an embodiment, when the 3D map generation system 101 detects that the conditions of the surroundings are back to normal conditions, the 3D map generation system 101 stops or suspends operations of the one or more sensing devices 109 and uses only the one or more cameras 105 for generating the 3D data representation of the surroundings.

In an embodiment, the 3D map 111 may be also displayed to a user of the vehicle on a display/infotainment system of the vehicle, on a Heads-up Display (HUD) of the vehicle or on a vehicle application installed on a user device.

Figure 1B:
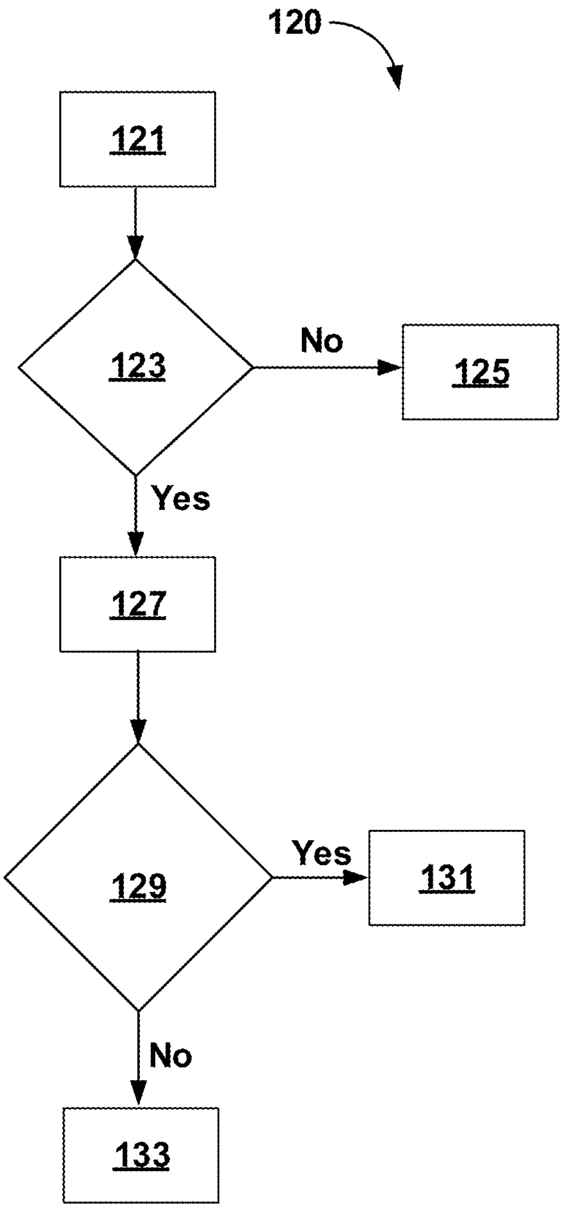
FIG. 1B illustrates an exemplary flow of operations in a 3D map generation system, in accordance with some embodiments of the present disclosure.

FIG. 1B illustrates an exemplary flow of operations in a 3D map generation system, in accordance with some embodiments of the present disclosure.

In an embodiment, when a user of the vehicle turns ON the vehicle and/or the driver of the vehicle enables self-driving mode in the vehicle, the Three-Dimensional (3D) map generation system 101 monitors the surroundings using the one or more detectors 107 (step 121). In an embodiment, the one or more detectors 107 checks if one or more special conditions have occurred in the surroundings of the vehicle (step 123). When the one or more special conditions are not detected, the 3D map generation system 101 generates a 3D map 111 using a 3D data representation generated using the image data captured by the one or more cameras 105 (step 125). On the other hand, if the one or more special conditions are detected, the 3D map generation system 101 controls each of the one or more cameras 105 and the one or more sensing devices 109 to operate alternately. In an embodiment, the 3D data representation is generated using the image data captured by the one or more cameras 105 and the further 3D data representation is generated using the sensor data captured by the one or more sensing devices 109 (step 127).

In an embodiment, the 3D map 111 generation module checks if there are any bad regions in the 3D data representation (step 129). In an embodiment, if there are bad regions in the 3D data representation, the bad regions are replaced with the further 3D data representation (step 131). In an embodiment, if there are no bad regions, the 3D map 111 is generated using both the 3D data representation 127 and the further 3D data representation alternately (step 133).

Figure 2:
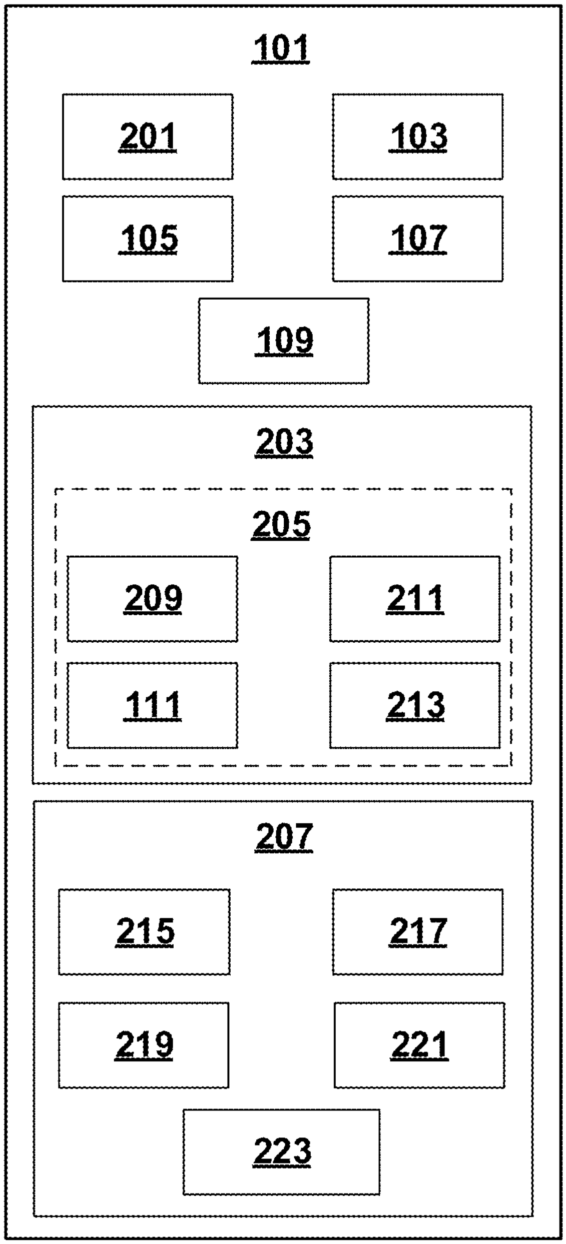
FIG. 2 shows a detailed block diagram of the 3D map generation system, in accordance with some embodiments of the present disclosure.

FIG. 2 shows a detailed block diagram of a Three-Dimensional (3D) map generation system 101, in accordance with some embodiments of the present disclosure.

In an embodiment, the 3D map generation system 101 may include an I/O Interface 201 and a memory 203. The I/O interface 201 may be configured for receiving and transmitting an input signal or/and an output signal related to one or more operations of the Three-Dimensional (3D) map generation system 101. In an embodiment, the memory 203 may store data 205 and one or more modules 207 of the 3D map generation system 101. In an embodiment, the data 205 stored in the memory 203 may include, without limitation, 3D data representation 209, further 3D data representation 211, a 3D map 111 and other data 213. In some implementations, the data 205 may be stored within the memory 203 in the form of various data structures. Additionally, the data 205 may be organized using data models, such as relational or hierarchical data models. The other data 213 may include various temporary data and files generated by the different components of the 3D map generation system 101.

In an embodiment, the 3D data representation 209 is generated using two-Dimensional (2D) images captured by the one or more cameras 105. In an embodiment, the 3D map generation system 101 uses a first pretrained Artificial Intelligence (AI) model to generate 3D data representation 209 using the 2D images. As an example, the first pretrained AI model may comprise, without limitation, a PSMNet model, a DeepPruner model and the like. In an embodiment, the first pretrained AI model generates depth data, which is then used to generate a 3D data representation. Further, the 3D data representation may be translated into a corresponding a 3D space for generating the 3D map 111.

In an embodiment, the further 3D data representation 211 is generated using sensor data captured by the one or more sensing devices 109. In an embodiment, the further 3D data representation 211 may be used to replace the bad regions in the 3D data representation 209. In an embodiment, during the one or more special conditions, a combination of the further 3D data representation 211 and the 3D data representation 209 are used to generate the 3D map 111.

In an embodiment, the 3D map 111 is map generated in a 3D space using the 3D data representation 209 and/or the further 3D data representation 211. In an embodiment, the 3D map 111 is generated using 3D data representation 209 in normal conditions. In an embodiment, the 3D map 111 is generated using both the 3D data representation 209 and the further 3D data representation 211 alternately, in the one or more special conditions. However, in an embodiment, during the normal conditions, the 3D map 111 is generated using the 3D data representation 209 generated using the image data captured by the one or more cameras 105. In an embodiment, the 3D map 111 generated by the 3D map generation system 101 may be used in autonomous driving.

In an embodiment, the data 205 may be processed by the one or more modules 207 of the 3D map generation system 101. In some implementations, the one or more modules 207 may be communicatively coupled to the processor 103 for performing one or more functions of the 3D map generation system 101. In an implementation, the one or more modules 207 may include, without limiting to, a detecting module 215, a controlling module 217, a generating module 219, a bad region detection module 221 and other modules 223. In an embodiment, the other modules 223 may be used to perform various miscellaneous functionalities of the 3D map generation system 101. It will be appreciated that such one or more modules 207 may be represented as a single module or a combination of different modules.

In an embodiment, the detecting module 215 may be associated with the one or more detectors 107 and configured to detect the one or more special conditions in the surroundings of the vehicles using real-time input signals received from the one or more detectors 107. In an embodiment, the detecting module 215 compares one or more events identified by the one or more detectors 107 with one or more predefined events for detecting the special conditions corresponding to the one or more events.

In an embodiment, the controlling module 217 may be configured to control each of the one or more cameras 105 and the one or more sensing devices 109. Also, the controlling module 217 may be used to operate the one or more cameras 105 and the one or more sensing devices 109 alternately, upon detecting the one or more special conditions by the detecting module 215.

In an embodiment, the generating module 219 may be configured to generate a Three-Dimensional (3D) data representation of the surroundings based on image data captured by the one or more cameras 105. In an embodiment, the generating module 219 may be also configured to generate a further 3D data representation 211 of the surroundings based on sensor data captured by the one or more sensing devices 109. In an embodiment, the generating module 219 may be configured to generate a 3D map 111 using the 3D data representation 209 and the further 3D data representation 211.

In an embodiment, the bad region detection module 215 may comprise a second predefined Artificial Intelligence (AI) model to detect bad regions in the Three-Dimensional (3D) data representation. In an embodiment, the bad region detection module 221 may be also configured to replace the one or more bad regions in the 3D data representation 209 with corresponding regions in the further 3D data representation 211, to result in a combined 3D map 111.

Figure 3:
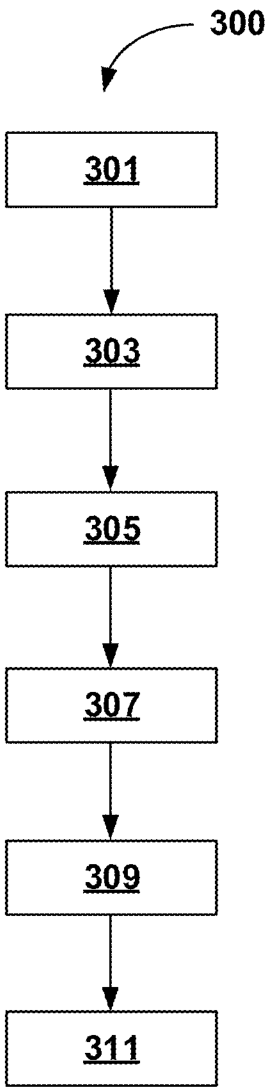
FIG. 3 illustrates a flowchart showing a method for creating 3-Dimensional (3D) map of surroundings of a vehicle, in accordance with some embodiments of present disclosure.

FIG. 3 illustrates a flowchart showing a method for creating 3-Dimensional (3D) map of surroundings of a vehicle, in accordance with some embodiments of present disclosure.

As illustrated in FIG. 3, the method 300 includes one or more blocks for generating 3D map 111 of surroundings of a vehicle using a 3D map generation system 101 illustrated in FIG. 2. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the method 300 includes detecting, by the Three-Dimensional (3D) map generation system 101, the one or more special conditions of the surroundings using the one or more detectors 107. In an embodiment, the one or more detectors 107 detect the one or more special conditions by monitoring the surroundings for detecting one or more events in the surroundings and comparing the one or more events with one or more predefined events for detecting the special conditions corresponding to the one or more events. In an embodiment, the one or more special conditions may comprise at least one of occurrence of an adverse weather condition, a low light condition, a low visibility condition or a physical obstruction to the one or more cameras 105.

At block 303, the method 300 includes controlling, by the 3D map generation system 101, each of the one or more cameras 105 and the one or more sensing devices 109 to operate alternately, upon detecting the one or more special conditions. In an embodiment, the 3D map 111 is generated using only the one or more cameras 105 during normal conditions of the surroundings.

At block 305, the method 300 includes generating, by the 3D map generation system 101, a Three-Dimensional (3D) data representation of the surroundings based on image data captured by the one or more cameras 105.

At block 307, the method 300 includes generating, by the 3D map generation system 101, a further Three-Dimensional (3D) data representation of the surroundings based on sensor data captured by the one or more sensing devices 109.

At block 309, the method 300 includes detecting, by the 3D map generation system 101, one or more bad regions in the 3D data representation 209.

At block 311, the method 300 includes replacing, by the 3D map generation system 101, the one or more bad regions in the 3D data representation 209 with corresponding regions in the further 3D data representation 211, to result in a combined 3D map 111. In an embodiment, the one or more cameras 105 and the one or more sensing devices 109 have at least substantially same field of view. In an embodiment, the 3D map generation system 101 uses a precalculated translation matrix to generate the 3D map 111 when the one or more cameras 105 and the one or more sensing devices 109 have different fields of view and when the 3D data representation 209 and the further 3D data representation 211 are in different 3D coordinate spaces.

Figure 4A:
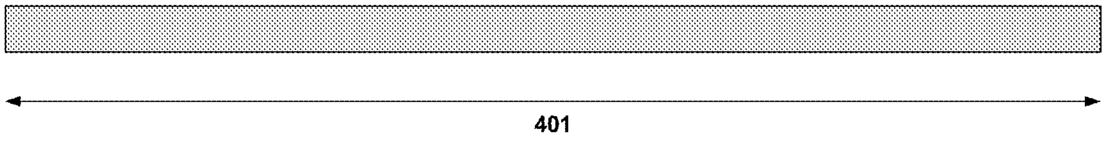
FIGS. 4A and 4B illustrate time multiplexed alternate operations of the one or more cameras and the one or more sensing devices, in accordance with some embodiments of the present disclosure.
Figure 4B:
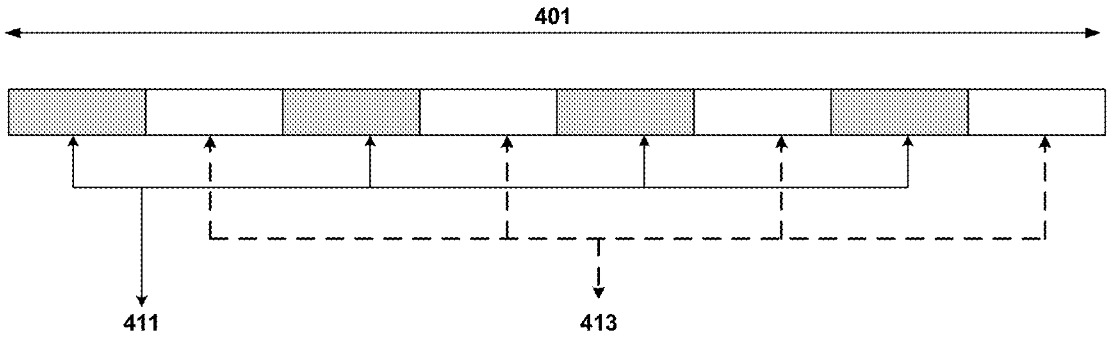

FIGS. 4A and 4B illustrate time multiplexed alternate operations of the one or more cameras and the one or more sensing devices, in accordance with some embodiments of the present disclosure.

In an embodiment, as illustrated in FIG. 4A, during the normal conditions, the Three-Dimensional (3D) map generation system 101 generates a 3D map 111 using 3D data representation 209 generated using image data captured by the one or more cameras 105. That is, as shown in the time frame 401, the one or more cameras 105 are active during the entire time duration 401 and the 3D map 111 is generated using only the one or more cameras 105. As an example, the time duration 401 may be 1 Second.

In an embodiment, as illustrated in FIG. 4B, during the one or more special conditions, the Three-Dimensional (3D) map generation system 101 generates a 3D map 111 using either the 3D data representation 209 obtained from the image data captured by the one or more cameras 105 or the further 3D data representation 211 obtained from the sensor data captured by the one or more sensing devices 109, which are sequentially and/or alternately activated in a multiplexed time frame. That is, both the one or more cameras 105 and the one or more sensing devices operate at predefined alternative time intervals. As an example, the predefined time interval may be 100 milliseconds. In an embodiment, as shown in FIG. 4B, the entire duration 401 may be split and shared among the one or more cameras 105 and the one or more sensing devices 109 for their alternate operation. In an embodiment, 411 indicates processing by the one or more sensing devices 109 and 413 indicates processing by the one or more camera devices.

In light of the technical advancements provided by the disclosed method and the 3D map generation system, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the 3D map generation system itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the application(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the application.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article, or a different number of devices/articles may be used instead of the shown number of devices or programs. The functionality and/or features of a device may be alternatively embodied by one or more other devices which are not explicitly described as having such functionality/features. Thus, other embodiments of application need not include the device itself.

Finally, the language used in the specification has been principally selected for readability and instructional purposes, and it may not have been selected to delineate or circumscribe the inventive subject matter. It is therefore intended that the scope of the application be limited not by this detailed description, but rather by any claims that issue on an application based here on. Accordingly, the embodiments of the present application are intended to be illustrative, but not limiting, of the scope of the application, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A three-dimensional (3D) map generation system comprising:

a processor;

one or more cameras configured to capture image data of surroundings of the 3D map generation system; and one or more sensors configured to detect an adverse weather condition, a low light condition, a low visibility condition, or a physical obstruction to the one or more cameras; and at least one of a LIDAR sensor and a radar sensor, wherein the processor is configured to:

control the one or more sensors to detect the adverse weather condition, the low light condition, the low visibility condition, or the physical obstruction to the one or more cameras;

upon detection of the adverse weather condition, the low light condition, the low visibility condition, or the physical obstruction to the one or more cameras, operate the one or more cameras and the at least one of a LIDAR sensor and a radar sensor alternately in a time-multiplexed manner with a predetermined interval;

generate a first 3D data representation of the surroundings based on the image data including by processing the image data with a first pre-trained artificial intelligence model to compute depth or disparity data for the surroundings;

generate a second 3D data representation of the surroundings based on sensor data captured by the at least one of the LIDAR sensor and the radar sensor;

detect, using a second pre-trained artificial intelligence model, one or more regions of unsatisfactory quality in the first 3D data representation; and replace regions of unsatisfactory quality with corresponding regions of the second 3D data representation if one or more regions of unsatisfactory quality exist in the first 3D data representation, to generate a combined 3D data representation that includes first regions generated from the image data detected under the adverse weather condition, the low light condition, the low visibility condition, or the physical obstruction to the one or more cameras and second regions generated from the sensor data generated under the adverse weather condition, the low light condition, the low visibility condition, or the physical obstruction to the one or more cameras.

2. The 3D map generation system of claim 1, wherein the one or more sensors detect the adverse weather condition, the low light condition, the low visibility condition, or the physical obstruction to the one or more cameras by:

monitoring the surroundings for detecting one or more events in the surroundings; and comparing the one or more events with one or more predefined events for detecting the adverse weather condition, the low light condition, the low visibility condition, or the physical obstruction to the one or more cameras corresponding to the one or more events.

3. The 3D map generation system of claim 1, wherein the one or more cameras and the one or more sensors have at least substantially the same field of view.

4. The 3D map generation system of claim 1, wherein the processor uses a precalculated translation matrix to generate the 3D combined 3D data representation.

* * * * *